United States Patent [19]
Ishikawa et al.

[11] Patent Number: 4,819,717
[45] Date of Patent: Apr. 11, 1989

[54] HEAT EXCHANGING UNIT WITH A HYDROGEN ADSORPTION ALLOY

[75] Inventors: Hiroshi Ishikawa; Keisuke Oguro; Hiroshi Suzuki; Akihiko Kato; Teruya Okada; Shizuo Sakamoto; Iwao Nishimura, all of Osaka; Keizo Sakaguchi, Hyogo, all of Japan

[73] Assignees: Agency of Industrial Science and Technology; Kurimoto Ltd., Osaka, both of Japan

[21] Appl. No.: 851,622

[22] Filed: Apr. 14, 1986

[30] Foreign Application Priority Data

Feb. 24, 1986 [JP] Japan .................. 61-38743

[51] Int. Cl.⁴ .......................................... F25B 17/08
[52] U.S. Cl. ........................... 165/104.12; 62/48; 55/269; 206/0.7; 29/157.3 R
[58] Field of Search ............ 165/104.12, 907; 62/48; 55/269; 206/0.7; 29/157.3 R

[56] References Cited

U.S. PATENT DOCUMENTS

| | | | |
|---|---|---|---|
| 3,095,255 | 6/1963 | Smith | 165/907 |
| 4,165,569 | 8/1979 | Mackay | 62/48 |
| 4,609,038 | 9/1986 | Ishibawa et al. | 165/104.12 |
| 4,674,563 | 6/1987 | Laxhuber | 165/104.12 |

FOREIGN PATENT DOCUMENTS 68448  6/1978  Japan .................. 165/104.12

Primary Examiner—Albert W. Davis, Jr.
Attorney, Agent, or Firm—Jones, Tullar & Cooper

[57] ABSTRACT

This invention relates to a novel heat exchanging unit with a hydrogen adsorption alloy of which thermal conductivity is kept high over a long period of use. Particularly in order to solve problems occurring at the time of forming a heat exchanging unit, by forming a compact of a hydrogen adsorption alloy and inserting a heat transfer element in the compact, such as insufficient heat transfer due to a small spacing produced between the compact and the heat transfer element, surface irregularities, decline in function due to micronization and scattering of the compact, difficulty in build-up, etc., there is disclosed a heat exchanging unit comprising a heat transfer element and a hydrogen adsorption alloy fitted to an outer periphery of the heat transfer element and solidly molded.

14 Claims, 8 Drawing Sheets

HEAT EXCHANGING UNIT WITH A HYDROGEN ADSORPTION ALLOY

CROSS REFERENCE TO RELATED APPLICATION

This application discloses subject matter in common with application, Ser. No. 851,624, filed Apr. 14, 1986.

BACKGROUND OF THE INVENTION

1. Field of the Invention

This invention relates to a heat exchanging unit with a hydrogen adsorption alloy mainly composed of metal hydride, and more particularly to a heat exchanging unit having a high heat exchange efficiency which is difficult to reduce in spite of repeated uses when the unit is incorporated into a heat exchanger.

2. Prior Art

Heretofore, several arts have been developed in which hydrogen is adsorbed in a certain metal or alloy to be stored therein and transferred therefrom in the form of a metal hydride. These arts have been further applied to such practical use as purification of hydrogen, pressure rise, heat pump, air-conditioning system, etc.

In such case, since an exothermic reaction or an endothermic reaction is necessarily taking place at the time the metal hydride adsorbs or discharges hydrogen, it is possible to take advantage of such a property for a heat exchanger, heat pump, etc.

When it is a principal object to store or transfer hydrogen, delivery of hydrogen is not effectively performed without rapid delivery of heat between the metal hydride and the outside in view of the high thermal efficiency of the heat exchanger or efficient storage and transfer of hydrogen.

However, a thermal conductivity of hydrogen adsorption alloy itself in the form of particles is not high, and therefore several attempts have been proposed aiming at efficient deliver of heat.

According to one of the proposed attempts, in order to improve the hydrogen adsorption alloy itself, surfaces of the particles are plated with a dissimilar metal of high thermal conductivity as described later with reference to this invention.

According to another attempt, the structure of a heat exchanging unit is improved so that a hydrogen adsorption alloy in the form of particles is brought into contact with a heat transfer element as close as possible. For example, as shown in FIG. 19, a heat exchanger manufactured by Solar Turbines Incorporated is disclosed, wherein a heat pump for temperature rise is provided with a tube and fins outside as a heat transfer element. Fourteen copper tubes 8A are disposed in fins 9A of large diameter being 0.02 inch in thickness, and spaces formed between the fins at an interval of 0.15 inch (3.8 mm) are filled with a metal hydride 6A. FIG. 20 shows another heat exchanger for prototype heat pump disclosed by the same company, having six radial fins 9B disposed in a copper tube 8B of 1 inch (25.4 mm) in inner diameter. Numeral 18 is a filter in FIG. 20. These two drawings are shown in pages 67 and 72 of Metal Hydride/Chemical Heatpump Development Product. Phase 1, Final Report, BNL-51539 published by Brookhaven National Laboratory.

A further proposed attempt is one which utilizes compression molding. FIG. 21 shows a proposal already made by the applicant and disclosed in U.S. Pat. No. 4,609,038, wherein surfaces of particles of hydrogen adsorption alloy are coated with a dissimilar metal by plating and molded into a compact 6C. Apertures are then perforated through the compact to insert a heat exchanging pipe 8C therethrough, the ends of the pipe being respectively communicated with a supply port and an exhaust port for a heating or cooling medium. A modification of this proposal is also disclosed in the foregoing application, wherein particles of hydrogen adsorption alloy coated with a dissimilar metal by plating are infiltrated into a porous material of high thermal conductivity and this porous material is formed into a compact by compression molding.

In effect, in order to improve thermal efficiency of a heat exchanger using a hydrogen adsorption alloy, there have been proposed means for improving the hydrogen adsorption alloy itself, means for increasing contact areas between the alloy particles and heat transfer surfaces as much as possible (by Solar Turbines Incorporated), and a method for improving a compact of hydrogen adsorption alloy formed by compression molding (i.e., porous metal matrix hydrides) proposed by Prof. Ron Technion and further improved by applicant.

The foregoing proposals, however, have their respective problems to be solved.

In the first attempt of improving a hydrogen adsorption alloy itself to elevate thermal conductivity, there is a limit in distance within which heat can be transferred from a heat transfer surface, since the thermal conductivity is essentially low when the alloy is in the form of particles. By the same reason, sufficient improvement of thermal conductivity is not attained, either, even when a lot of fins are densely fitted for rapid delivery of heat in the second attempt of increasing the contact area.

In this connection, a filter is usually fitted for shielding the alloy from outside in order to prevent the alloy particles from floating and getting out, but since an apparent specific gravity of the alloy is small and there is no bonding strength among particles when the alloy is in the particle state, such shielding does not bring a stable holding of the alloy. That is, when the hydrogen adsorption alloy is repeatedly used, free particles are further micronized and collapsed by repetition of shrinkage and expansion leading eventually to the particles getting out and being scattered. In this way, when lots of fins are densely fitted to increase the heat transfer area, the thermal conductivity is declined rather than improved.

In the third attempt of molding the particles into a compact, thermal conductivity is indeed considerably improved as compared with the form of particles or powder, but a problem exists in how to make close contact between a heat-transfer element and a hydrogen adsorption alloy compact without maintaining a heat insulating boundary. For example, in the case of arranging a heat exchanging unit by forming a compact of alloy (formed by compression molding) as shown in FIG. 21 and inserting several heat transfer pipes (copper pipes) through inside of the compact, it is necessary to provide through holes for insertion of the heat-transfer pipes. Such through holes can be made directly on the compact after molding it. It is also possible to arrange preliminarily a mold suitable for formation of such holes. But in any case, a spacing is required between the compact and the heat transfer pipe, because without such spacing it is impossible to build up a heat exchanging unit by the insertion of pipes.

Thus, it is an essential requirement for the prior art to maintain a spacing, and this spacing negatively affects the heat transfer between the heat transfer element and the compact of hydrogen adsorption alloy.

SUMMARY OF THE INVENTION

Accordingly, the ultimate goal of this invention is to provide a novel heat exchanging unit with a hydrogen adsorption alloy the thermal conductivity of which is kept high over a long period of use.

In order to accomplish the foregoing goal, it is a first object to prevent deterioration of surface stability of the compact due to partial collapse and micronization thereof resulting in an irregular surface when making a hole through the compact for insertion of a heat transfer element or when actually inserting a pipe through the hole.

It is a second object not to produce a spacing at all between the surface of the compact and the heat transfer element, i.e., to establish a solid heat transfer relation therebetween so that the collapse and micronization of the compact starting from this spacing portion due to repetition of shrinkage and expansion may be successfully prevented.

It is a third object to attain various modifications of a heat exchanging unit difficult to attain under the prior art by a relatively simple method. As a matter of fact, a rather intricate process will be required when fitting fins to the compact, and there may be cases nearly impossible to fit them. For example, in the case of an arrangement in which the outer periphery of a cylindrical tube is wound with concentric spiral fins, it is quite difficult to incorporate the compact between the spiral fins.

The foregoing objects are accomplished by providing a heat exchanging unit with a hydrogen adsorption alloy comprising a tubular heat transfer element with its external diameter smaller than an inner diameter of a mold, the heat transfer element being inserted in the axial center of an elastic cylindrical mold, fine particles of a hydrogen adsorption alloy infiltrated between an inner wall of the mold and an outer wall of the heat transfer element, the heat transfer element and said hydrogen adsorption alloy being solidly formed into a unit by compression molding in a pressure vessel using a fluid as a medium by applying an even pressure from an inner wall of the heat transfer element and an outer wall of the mold.

Several modifications of the tubular heat transfer element can be attained on condition that a material of high thermal conductivity is used. These modifications can be a straight tube, a straight corrugated tube, a bend tube, a curved corrugated tube, a combination of a plurality of straight tubes and/or bend tubes, a combination of a plurality of straight and/or curved corrugated tubes, and a structure with a lot of fins projected either radially on the outer periphery of respective tubes or making a right angle to the axis of the tube.

The function of this invention in connection with the noted arrangement is as follows.

The elastic closed mold comprises a cylindrical body, a top member and a bottom member, both used for closing upper and lower ends of the cylindrical body. First, the bottom member is fitted to the lower end of the cylindrical body, and a heat transfer element is inserted in the cylindrical body through a hole formed in the center of the bottom member.

The particles of hydrogen adsorption alloy are infiltrated between the cylindrical body and the heat transfer element, and after being filled with the alloy, the heat transfer element is inserted through a hole formed in the center of the top member, then the top member is fitted on the cylindrical body. Since all of the cylindrical body, top member and bottom member are composed of elastic material, a closed state is successfully attained by elasticity enabling mutual tightening.

Keeping the foregoing state, these elements are placed in a pressure vessel, and either a liquid pressure or an air pressure is evenly applied to the whole part from both outer wall of the mold and inner wall of the heat transfer element. Since the mold is elastic, the whole part is evenly compressed by the fluid pressure and this pressure is transferred to the hydrogen adsorption alloy inside. Since the equal pressure is also applied to the tubular heat transfer element from inside, the pressure is balanced through the tube, and the hydrogen adsorption alloy inside is uniformly pressed. As a result, the hydrogen adsorption alloy in the form of fine particles is subject to an accurate and uniform molding.

The function described above is equally exhibited with any of the modifications disclosed by using a closed mold matched to each modification of heat transfer element. The function remains unchanged whether a tubular heat transfer element is provided with fins on the outer periphery thereof or not and whether a single element or plural elements be incorporated, so long as the closed mold is fit for the heat transfer element.

Thus, in accordance with this invention, since the heat transfer element and particles of hydrogen adsorption alloy are solidly and uniformly pressed and formed into a unit, every element is perfectly bonded to each other without any spacing between them, and there is no heat insulating boundary negatively affecting the delivery of heat at all.

Furthermore, when applying such an integral heat exchanging unit to a heat exchanger, the unit is prevented from being micronized, broken, etc. at the time of build-up, and surface stability of the alloy is not deteriorated. Accordingly, micronization or collapse of the alloy compact of the unit will surely be reduced in the course of operation of the heat exchanger.

In addition, there is no restriction on the shape of the unit as far as a cylindrical heat transfer element is used and various modifications can be attained as above mentioned.

BRIEF DESCRIPTION OF THE DRAWINGS

Other features of this invention will be apparent in the course of the following description in conjunction with the accompanying drawings wherein.

DESCRIPTION OF THE PREFERRED EMBODIMENTS

Figure 2:
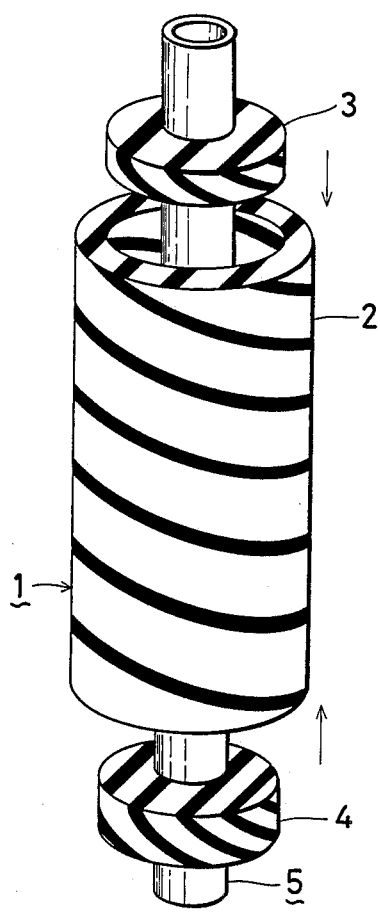
FIG. 2 is an exploded perspective view showing a closed mold and a heat transfer element.

Referring to FIG. 2, a closed mold 1 comprises a cylindrical body 2, a top member 3 and a bottom member 4, all of which are composed of a soft synthetic rubber. The thickness of the mold is 7 mm.

First the bottom member 4 is fitted to a bottom part of the cylindrical body 2, and a heat transfer element 5 is inserted in the cylindrical body 2 through a hole in the bottom member 4. The heat transfer element 5 of this embodiment comprises a heat transfer tube 8 and fins 9. The heat transfer tube 8 is a high thermal conductor composed of a copper or aluminum metal. The tube 8 of this embodiment is 16 mm in internal diameter, 0.5 mm in thickness and surrounded with concentric fins 9 of 0.5 mm in thickness and 35 mm in external diameter at intervals of 5 mm. In other words, a tube with fins soldered is used in this embodiment. The internal diameter of the cylindrical body 2 is a little bit larger than the outer edges of the fins 900. Since both the cylindrical body 2 and the bottom member 4 are elastic, they are deformed a little by a mutual fitting force and tightly fitted at their boundary pressing each other.

Then, a spacing between the cylindrical body 2 and the heat transfer tube 8 is filled with fine particles (powder) of hydrogen adsorption alloy 6. Usually it is easy to infiltrate the fine particles when they are dry. In order to fill up spaces between the fins with particles, it is preferred to vibration or swing the cylindrical body when necessary. The hydrogen adsorption alloy to be used is not always necessary to be specified, but in this embodiment, in view of achieving the foregoing objects as effectively as possible, a preceding invention entitled "Method for manufacturing hydrogen adsorption alloy material" which was filed by a part of the applicants of the present invention and laid open under Japanese provisional publication No. 59-46161 is employed as described hereafter.

In the first place, a Mm $Ni_{4.5}$ $Mn_{0.5}$ is transformed to a powdered material of fine particles the average grain size of which average grain size is approximately 15 $\mu$m by repeating the absorption and discharge of hydrogen. Then, after being degreased and cleaned, the powdered material is coated with copper by means of a wet electroless plating of autocatalysis using a reducer. In this process, the powdered material is directly immersed into a plating solution for surface reaction thereof, but when the initiation reaction is insufficient, the powdered material is to be immersed in a known activator solution containing a palladium salt for activation treatment.

In this autocatalytic electroless plating with copper using a reducer, a folmaldehyde is used as a reducer, and a plated film of approximately 1 $\mu$m in thickness is formed by the plating process for about 40 minutes at 30° C. while stirring an electroless plating solution of TMP chemical copper #500 (produced by Okuno Chemical Industries Co., Ltd.). After the surface reaction, the fine particles are washed in water and dried at a low temperature.

After filling up with the fine particles, the top member 3 is fitted to the body 2 and a perfect sealing or closing is attained due to the elasticity thereof.

Figure 3:
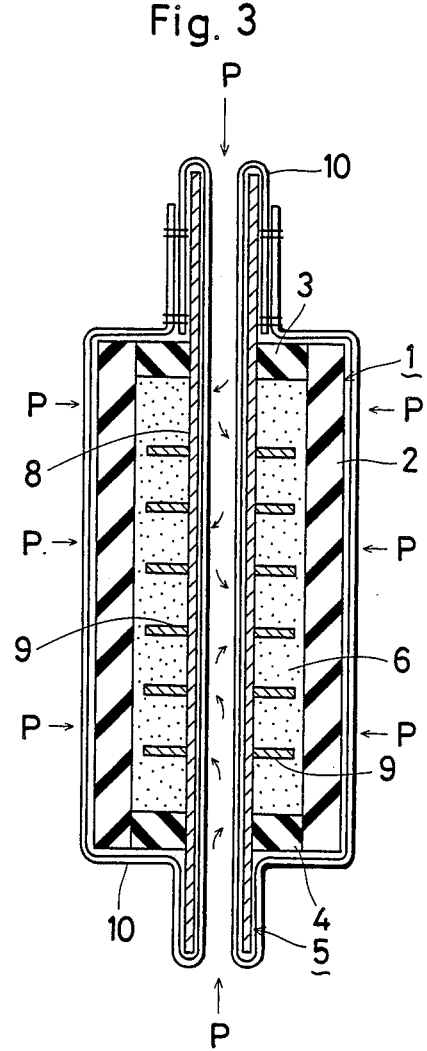
FIG. 3 is a sectional front view showing an assembled state of the closed mold and heat transfer element.

A pressure is then applied to this closed mold using a fluid as a medium. At this step a certain know-how is required in order to prevent the medium flowing into the closed mold and contacting the hydrogen adsorption alloy inside. In this embodiment, as shown in FIG. 3, a cylindrical film 10 of thin, flexible and soft rubber is applied to the whole closed mold so as to wrap it. Then, one end of the cylindrical film is folded and inserted into the heat transfer tube 8 from one end thereof to be taken out of the other end being sucked by a vacuum pump. The end taken out is further pulled by the vacuum pump to impart a tension to the wrapping film 10 and fastened to the other end with which it is overlapped. A tight fit is thus attained between the film and the closed mold. As a matter of course, it will be possible to shut off the direct contact between the fluid and the hydrogen adsorption alloy by other methods.

Figure 1:
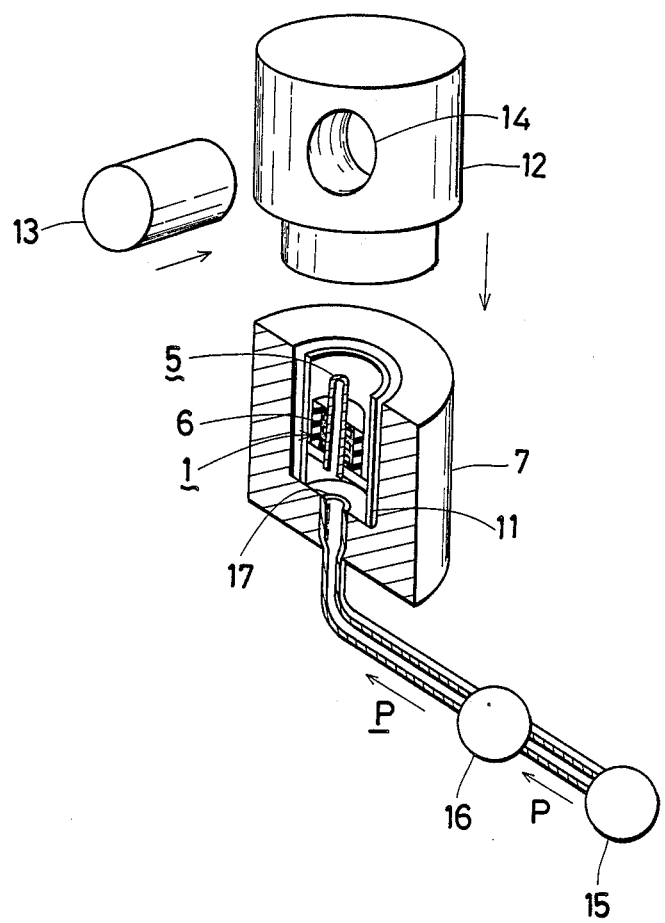
FIG. 1 is a partial sectional perspective view showing an embodiment according to this invention.

The closed mold 1 (wrapped with the film 10) is placed on a holder 11 and put together in a pressure vessel 7 incorporated in a press of uniform pressure as shown in FIG. 1. When the preparation for pressing is completed, the top member 12 is put on and a lockpin 13 is inserted in a hole 14 provided laterally through the top member 12.

When pressing by a press of uniform pressure in this embodiment, a necessary air pressure is supplied from a separate compressor 15, and pressure water is generated by actuating a water pump 16 with such pressure air. Thus a pressure is transferred to the pressure vessel through a pressure transfer inlet 17 formed at the bottom part of the vessel. As the water serving as a pressure medium passes through the water pump 16, it is preferred to add an emulsifier for emulsion of the water for the purpose of lubrication and rust prevention. In order to obtain a strong and close-packed compact, application of about 1.5–2 T/cm$^2$ of static pressure to the mold surface is quite sufficient.

Figure 4:
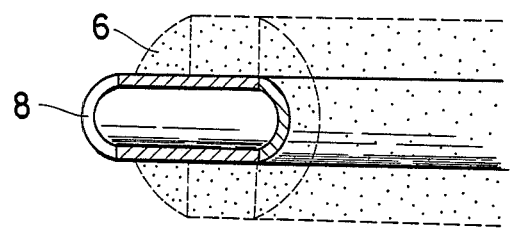
FIGS. 4 to 16 are partially cutaway perspective views showing various modifications.
Figure 5:
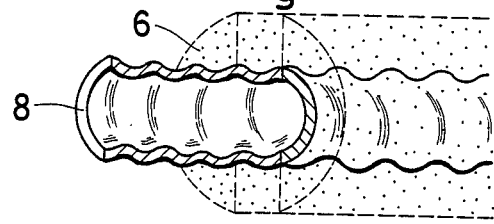
Figure 6:
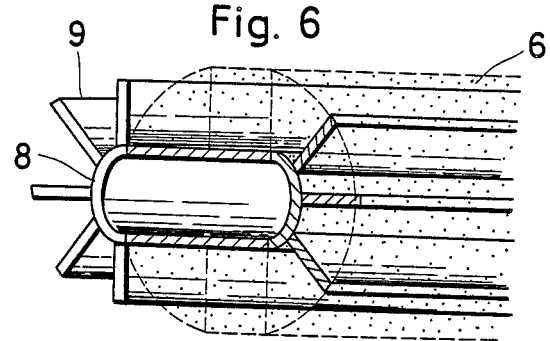
Figure 7:
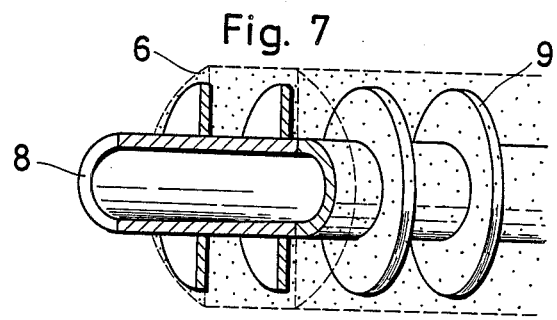
Figure 8:
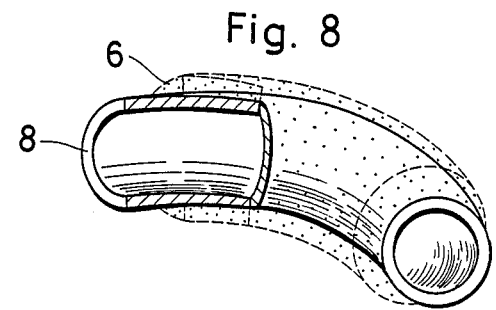
Figure 9:
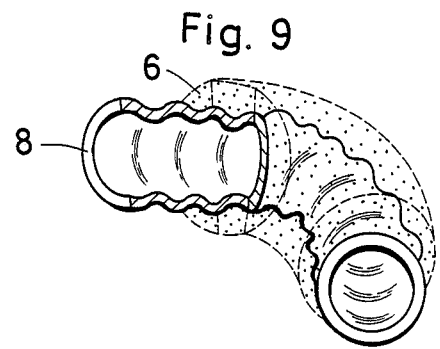
Figure 10:
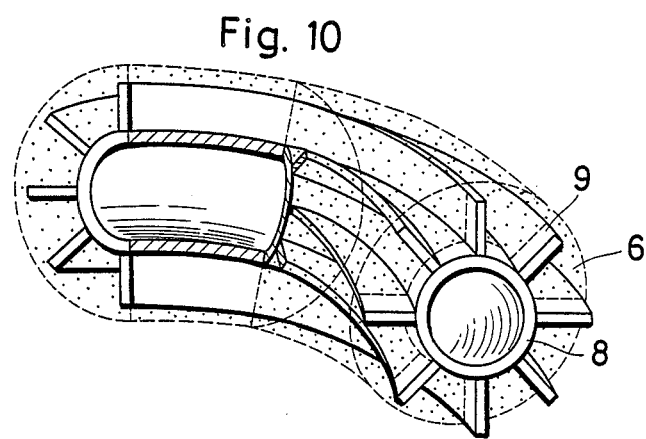
Figure 11:
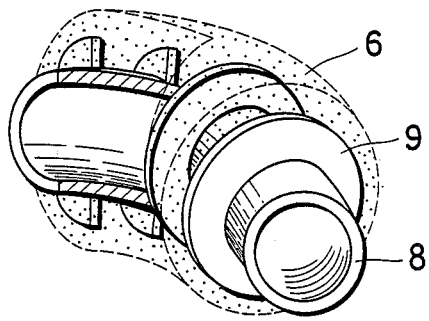
Figure 12:
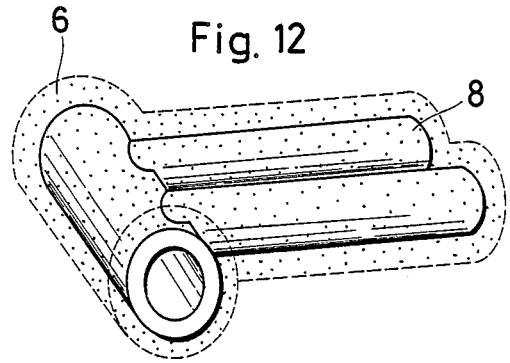
Figure 13:
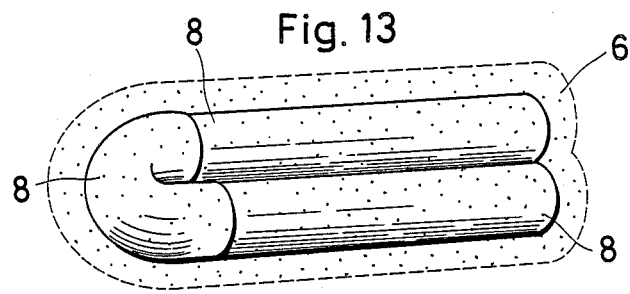
Figure 14:
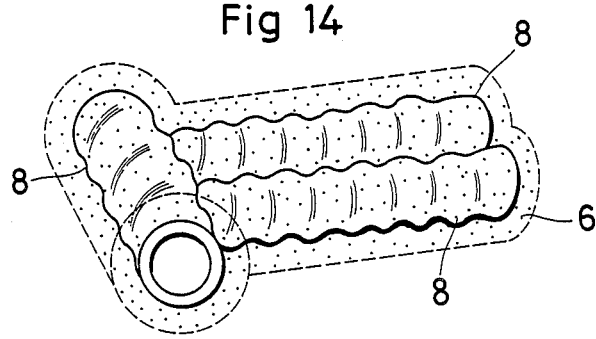
Figure 15:
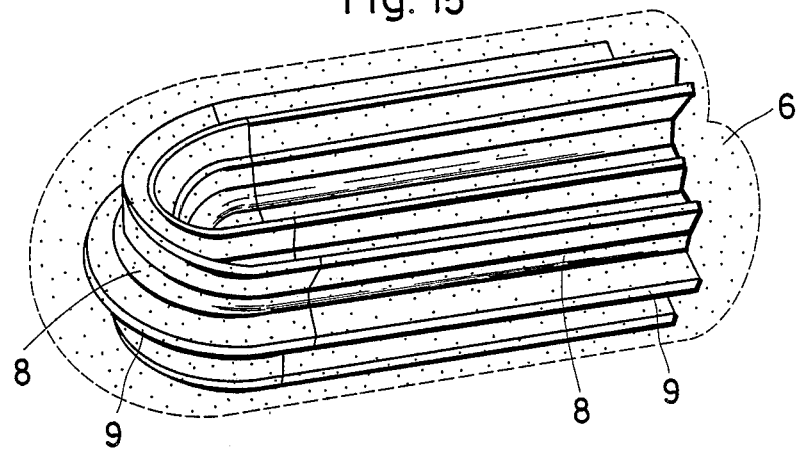
Figure 16:
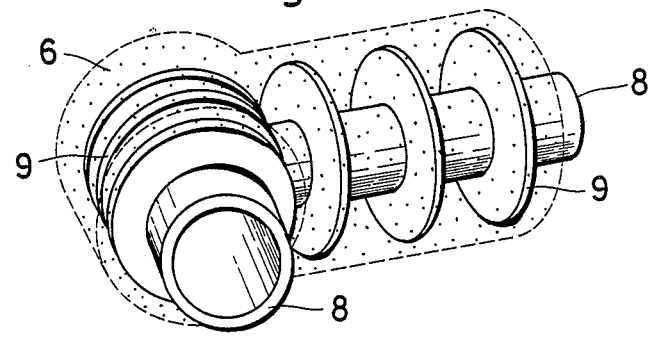

In FIGS. 4 to 16 various modifications of combination between the hydrogen adsorption alloy and the heat transfer element 5 (i.e., the heat transfer tube 8 and the fins 9) to be solidly formed are shown. FIG. 4 shows that the heat transfer tube comprises a straight tube, FIG. 5 shows the heat transfer tube comprises a stragitht corrugated tube, FIG. 6 shows the tube comprises a straight tube and radial fins, FIG. 7 shows the tube comprises a straight tube and fins making a right angle to the axis of tube, FIG. 8 shows the tube comprises a curved bend tube, FIG. 9 shows the tube comprises a curved corrugated tube, FIG. 10 comprises a bend tube and radial fins, FIG. 11 shows the tube comprises a bend tube and fins making a right angle to the axis of tube, FIGS. 12 and 13 show the tube comprises a combination of a plurality of straight tubes and/or bend tubes, FIG. 14 shows the tube comprises a combination of a plurality of straight corrugated tubes, FIG. 15 shows the tube comprises a combination of a plurality of straight tubes, a bend tube and radial fins provided on the outer periphery of each tube, and FIG. 16 shows the tube comprises a combination of a plurality of straight tubes and fins making a right angle to the axis of tube. As for the fins making a right angle to the axis of the tube, such fins as recutangular fins, spiral fins wound continuously on the tube, etc. can be attained other than round slice-shaped fins shown in FIGS. 7, 11 and 16.

Described hereafter is a heat transfer effect exhibited by this invention and determined by quantitative measurement of several examples.

Examples to be measured or experimented comprise a copper tube of 0.5 mm in thickness and 16 mm in external diameter, copper fins of 0.5 mm in thickness and 35 mm in external diameter and which are welded at a pitch of 5 mm to the outer periphery of the tube, and a hydrogen adsorption alloy into which the fins are embedded, the elements being formed into a unit. Surfaces of fine particles of hydrogen adsorption alloy composed of La $Ni_{4.5}Al_{0.5}$ are coated with copper by electroless plating using a reducer.

In this way, a combined material in which the hydrogen adsorption alloy and the copper are contained in the ratio of 100 to 20 is obtained. This material is formed into three examples by a press of uniform pressure with water as a medium by applying pressures of 1.0 $T/cm^2$ (Example 1), 1.5 $T/cm^2$ (Example 2) and 2.0 $T/cm^2$ (Example 3) respectively to the material.

On the other hand, a tube with fins is filled with fine particles of hydrogen adsorption alloy the surfaces of which are not coated and formed into a unit as Control 1.

Then, fine particles of hydrogen adsorption alloy with their surfaces coated with copper in the same manner as the examples are formed into doughnut-shaped disks of 35 mm in external diameter, 16 mm in internal diameter and 0.4 mm in thickness by a hydraulic one-way press, and by inserting a copper pipe of 16 mm in external diameter in a hollow portion of the doughnut disks and putting them between fins of 0.5 mm in thickness, 35 mm in external diameter and 16 mm in internal diameter in the form of a sandwich, Control 2 is obtained having a similar appearance to the examples.

Furthermore, fine particles of hydrogen adsorption alloy with their surfaces coated with a copper are formed into 8 pieces of pellets of 9 mm in external diameter and 4 mm in thickness by a hydraulic one-way press, and they are put between fins surrounding a copper pipe to obtain Control 3.

A pressure needed for molding the Controls 2 and 3 is 5 $T/cm^2$.

The examples and controls obtained in this way are shown in the following Table 1:

TABLE 1

|  | Control 1 | Control 2 | Control 3 | Example 1 | Example 2 | Example 3 |
|---|---|---|---|---|---|---|
| Fine particles of hydrogen adsorption alloy | $LaNi_{4.5}Al_{0.5}$ | " | " | " | " | " |
| Coating | Not coated | Electroless plating with copper | " | " | " | " |
| Filling up (%) | 100 | 89 | 59.4 | 100 | 100 | 100 |
| Molding method | Not molded | One-way press 5 $T/cm^2$ | One-way press 5 $T/cm^2$ | Uniform press 1.0 $T/cm^2$ | Uniform press 1.5 $T/cm^2$ | Uniform press 2.0 $T/cm^2$ |
| Density of filling up $g/cm^3$ | 2.3 | 5.6 | 5.6 | 4.5 | 5.0 | 5.1 |

Figure 17:
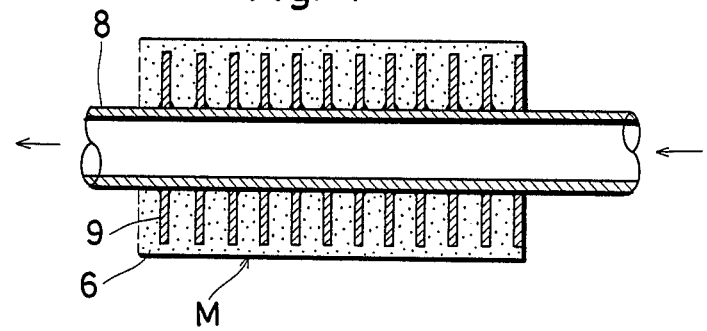
FIG. 17 is a sectional front view showing how to measure a quantitative effect of this invention.

Measurement of examples and controls is performed by determining the thermal conductivity thereof. That is, by flowing hot water at 65° C. through a fin tube as shown in FIG. 17, a surface temperature of each sample is measured by an alumel-chromel thermocouple attached to a measuring point M.

Figure 18:
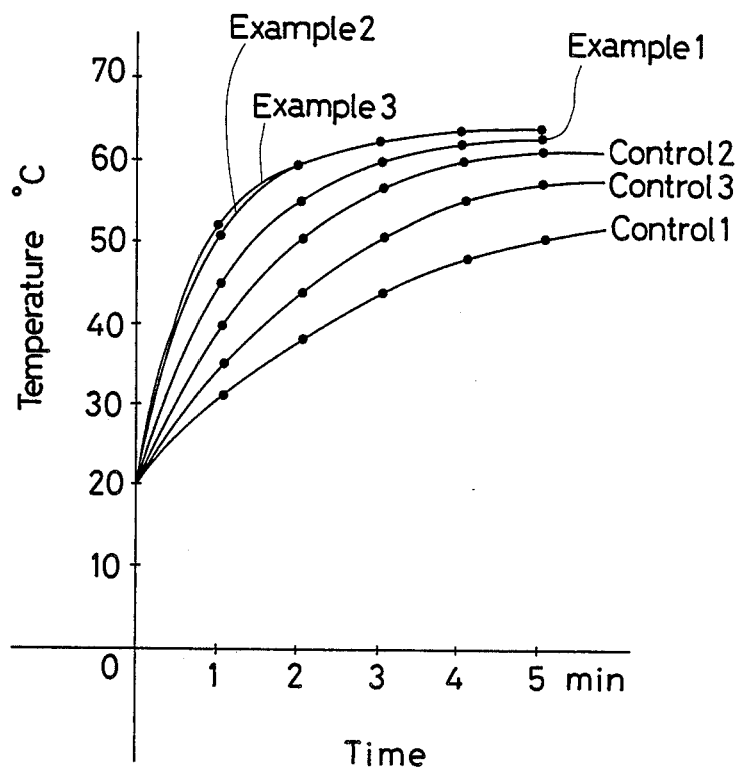
FIG. 18 is a curve of time and temperature to show one example of such effect.
Figure 19:
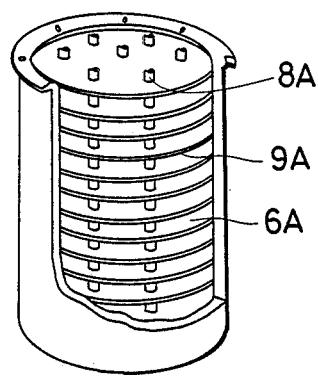
FIGS. 19 to 21 are perspective views showing various prior arts, respectively.
Figure 20:
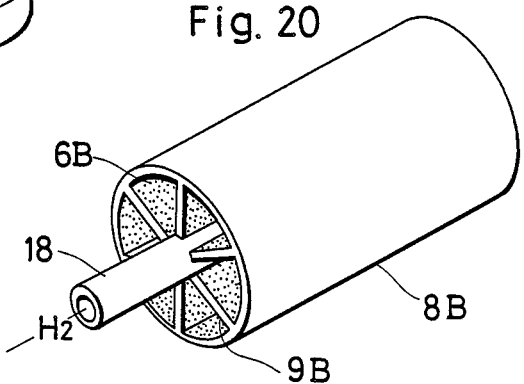
Figure 21:
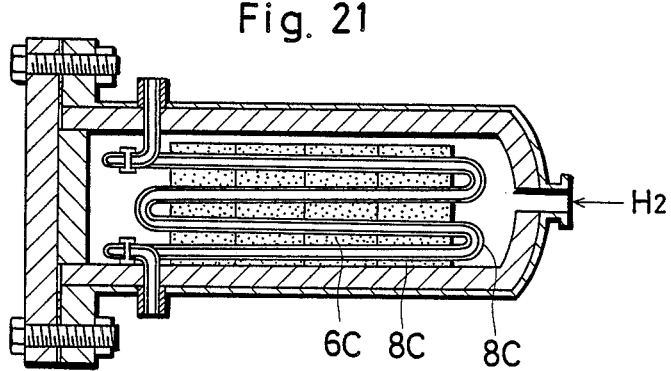

As a result of measurements, it is found that the difference is considerable in rise time up to a lapse of 1-2 minutes as shown in FIG. 18, which suggests a rapid heat transfer of the examples.

In addition to the foregoing main advantage, it is also to be noted that at the process of molding the particles of hydrogen adsorption alloy by a liquid pressure press according to this invention, a pressure of 1.5-2.0 $T/cm^2$ is quite enough for the molding while 5 $T/cm^2$ is required under a conventional one-way press. This secondary advantage is attained by the application of uniform pressure also from inside of the heat transfer tube, although a press of uniform pressure itself is well known for its applicability to molding of particles.

Furthermore, the foregoing examples exhibit a peculiar effect such that a heating or cooling medium passing through the heat transfer tube is inhibited from flowing smoothly to a certain extent due to irregularities formed by shrinkage and expansion of the tube wall resulting in a mixed flow of the medium itself, which brings about unification of inside temperature and successful heat transfer between the medium and the tube since a stagnation or oscillation of medium flow is preferably produced in the pipe.

Irregularities are also formed on the contact surface between the outer wall of the heat transfer tube and the hydrogen adsorption alloy, which improves engagement or tight fitting therebetween.

While the above-described embodiments represent the preferred forms of this invention, it is to be understood that modifications will occur to those skilled in this art without departing from the spirit of this invention. The scope of this invention is therefore to be determined solely by the appended claims.

What is claimed is:

1. The combination comprising:
   a heat exchanging unit including: an elongated heat transfer element defining an outer surface; and a quantity of fine particles of hydrogen adsorption alloy surrounding the outer surface of the heat transfer element for at least a part of its length in a condition such that the fine particles of hydrogen adsorption alloy are bonded to each other to form a close-packed compact, said compact being bonded to the outer surface of the heat transfer element which it surrounds; and
   a hollow cylindrical elastic mold defining an inner surface, wherein;
   said heat transfer element is mounted to the mold such that the outer surface thereof is coextensive with a portion of the inner surface of the mold with the diameter defined by said portion being greater than the diameter defined by said outer surface; and
   said heat transfer element and said mold form a sealed unit due to the elasticity of the mold when a pressure is applied to said combination, so that an even pressure is applied by the inner surface of the mold and the outer surface of the heat transfer element to the fine particles of hydrogen adsorption alloy for the integral formation of the heat exchanging unit.

2. A heat exchanging unit as claimed in claim 1, wherein said heat transfer element is a thermal conductive straight tube.

3. A heat exchanging unit as claimed in claim 1, wherein said heat transfer element is a straight corrugated tube manufactured by forging.

4. A heat exchanging unit as claimed, in claim 1, wherein said heat transfer element comprises a thermal conductive straight tube and a plurality of fins provided radially on an outer periphery of the tube.

5. A heat exchanging unit as claimed in claim 1, wherein said heat transfer element comprises a thermal conductive straight tube and a plurality of fins provided on the outer periphery of the tube making a right angle to the axis of the tube.

6. A heat exchanging unit as claimed in claim 1, wherein said heat transfer element is a bend tube.

7. A heat exchanging unit as claimed in claim 1, wherein said heat transfer element is a curbed corrugated tube manufactured by forging.

8. A heat exchanging unit as claimed in claim 1, wherein said heat transfer element comprises a thermal conductive bend tube and a plurality of fins provided radially on the outer periphery of the tube.

9. A heat exchanging unit as claimed in claim 1, wherein said heat transfer element comprises a thermal conductive bend tube and a plurality of fins provided on the outer periphery of the tube making a right angle of the axis of the tube.

10. A heat exchanging unit as claimed in claim 1, wherein said heat transfer element is a combination of a plurality of straight tubes and/or bend tubes.

11. A heat exchanging unit as claimed in claim 1, wherein said heat transfer element is a combination of a plurality of straight tubes and/or curved corrugated tubes manufactured by forging.

12. A heat exchanging unit as claimed in claim 1, wherein said heat transfer element is a combination of a plurality of straight tubes and/or bend tubes with a plurality of fins radially provided on the outer peripheries of respective tubes.

13. A heat exchanging unit as claimed in claim 1, wherein said heat transfer element is a combination of a plurality of straight tubes and/or bend tubes with a plurality of fins provided on the outer peripheries of respective tubes making a right angle to the tubes.

14. A heat exchanging unit as defined in claim 1, wherein the heat transfer element and mold are wrapped with a thin, flexible film.

* * * * *